United States Patent
Kao et al.

(10) Patent No.: US 7,796,832 B2
(45) Date of Patent: Sep. 14, 2010

(54) CIRCUIT AND METHOD OF DYNAMIC CONTRAST ENHANCEMENT

(75) Inventors: Meng-Chao Kao, Taipei (TW); Tzu-Chiang Shen, Taoyuan County (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 925 days.

(21) Appl. No.: 11/619,389

(22) Filed: Jan. 3, 2007

(65) Prior Publication Data

US 2008/0158429 A1 Jul. 3, 2008

(51) Int. Cl.
G06K 9/40 (2006.01)
H04N 5/14 (2006.01)
(52) U.S. Cl. .................. 382/274; 348/671; 348/672
(58) Field of Classification Search .......... 382/168, 382/169, 171, 172, 254, 270, 271, 274; 348/671, 348/672, 674, 687, 645, 646; 358/521, 522
See application file for complete search history.

(56) References Cited

U.S. PATENT DOCUMENTS

| | | | |
|---|---|---|---|
| 6,373,533 B1 * | 4/2002 | Kawabata et al. | 348/672 |
| 6,463,173 B1 * | 10/2002 | Tretter | 382/168 |
| 6,795,063 B2 | 9/2004 | Endo et al. | |
| 2003/0169248 A1 | 9/2003 | Kim et al. | |
| 2004/0155855 A1 | 8/2004 | Chang | |
| 2004/0258324 A1 * | 12/2004 | Liang et al. | 382/274 |
| 2005/0104842 A1 | 5/2005 | Baik | |

FOREIGN PATENT DOCUMENTS

| | | |
|---|---|---|
| JP | 09-065252 | 3/1997 |
| JP | 10-261078 | 9/1998 |
| JP | 2002-010104 | 1/2002 |
| JP | 2002-27285 | 1/2002 |
| TW | 200401251 | 1/2004 |
| TW | 584831 | 4/2004 |

OTHER PUBLICATIONS

Japanese Examination Report of Japan Application No. 2007-144430, dated Nov. 17, 2009 (English translation not provided).

* cited by examiner

*Primary Examiner*—Yon Couso
(74) *Attorney, Agent, or Firm*—J.C. Patents

(57) ABSTRACT

A dynamic contrast enhancement circuit (DCE circuit) includes a grayscale statistical unit, an operation unit and a transformation unit. Wherein, the grayscale statistical unit receives a frame and divides the grayscale distribution of the frame into a plurality of statistical intervals to count the number of pixels of every statistical interval and obtains a plurality of statistical values. When one of the statistical values is greater than a threshold value, the operation unit would adjust every the statistical value according to the difference value between the statistical value exceeding the threshold value and the threshold value. In this way, the transformation unit is able to produce a transformation data according to the adjusted statistical values, so as to perform a DCE processing on the frame.

17 Claims, 8 Drawing Sheets

CIRCUIT AND METHOD OF DYNAMIC CONTRAST ENHANCEMENT

BACKGROUND OF THE INVENTION

1. Field of Invention

The present invention relates to a method of dynamic contrast enhancement, and more particularly, to a method for conducting dynamic contrast enhancement by using a threshold value.

2. Description of the Related Art

The so-called dynamic contrast enhancement (DCE) is an image processing technique, by which the grayscales of an input image are re-assigned mainly for increasing the dynamic range of the important portion of the image and enhancing the visual contrast of image characteristics. Taking an 8-bit image with 256 grayscales as an example, the grayscales thereof can possess a uniform distribution across the 0-255 range. However, as a matter of fact, the grayscale distribution of an image in a film is varied.

In terms of image processing, the statistical histogram-balancing technique is a classic and effective means to enhance images. Once a frame data is received, the image characteristics of the frame would be transformed into one with a more uniform grayscale distribution in the prior art. It is well known that a histogram of an image is an approximate probability density function (approximate pdf) of the grayscale levels of all the pixels corresponding to the image. A histogram-balancing processing is able to make the image after received the processing have a uniform or an approximate uniform distribution of the pixel numbers across all the grayscale levels. Limited by a real circuit, however, it is not feasible to produce a distribution considering every individual grayscale.

Therefore, the conventional processing is to perform a statistical algorithm on a received frame based on a certain number of discrete statistical intervals. FIG. 1A is a grayscale distribution graph of a frame and FIG. 1B is the transformation curve graph of the frame in FIG. 1A after performing dynamic contrast enhancement processing based on the prior art. Referring to FIGS. 1 and 2, in the prior art, the entire nominal grayscale range of a frame is equally divided into a certain number of intervals. For example, in FIG. 1A, there are four intervals in total, which are n1(0-63), n2(64-127), n3(128-191) and n4(192-255). After that, the number of pixels of each the interval is counted, so as to produce a statistical histogram shown by FIG. 1B.

Assuming the number of pixels of each the interval, i.e. the statistical values, is 575, 374, 393 and 97 corresponding to n1, n2, n3 and n4, respectively; hence, an average number of pixels of every internal should be 360. In the prior art, the statistical value of every interval is divided by 360 in this case to obtain a value defined as a slope value for every interval. For example, the statistical value '575' of the interval n1 is divided by 360 and a slope value of 1.6 is obtained. After all the slope values corresponding to all the intervals are calculated, a transformation curve 101 as shown in FIG. 1B can be constructed. Thus, the pixel number of each interval can be further adjusted according to the transformation curve, so as to perform a DCE processing on the frame.

Note that not all images have a grayscale distribution like the curve shown in FIG. 1A. FIG. 2A is a grayscale distribution graph of another frame. Referring to FIG. 2A, in some frames, most of the pixels are likely to be concentrated in a narrow range of grayscale, and the corresponding transformation curve is accordingly as shown in FIG. 2B.

Referring to FIG. 2B, since most of the pixel numbers fall in the first interval of the grayscale distribution graph, the transformation curve 201 in FIG. 2B drastically climbs up at the beginning, while, in contrast, the slopes of the transformation curve 201 across the rest intervals are nearly zero.

FIG. 2C is the updated grayscale distribution graph of the frame in FIG. 2A by using the transformation curve in FIG. 2B. Referring to FIG. 2C, it is clear that the grayscale distribution within the first interval resulted from performing a DCE processing by using the prior art is much different from the original distribution as shown in FIG. 2A, and that is a distortion frame image caused by an excessive enhancement processing.

In addition, the conventional technique is not suitable for processing a frame image with a black background area, either. FIG. 3 is a diagram of a frame with two black background areas. It is known that some frames include not only a normal display area 301, but also full-dark display areas 303 and 305 without any frame displayed. The areas 303 and 305, as shown in FIG. 3, are termed as black background areas.

During calculating out a transformation curve to perform a DCE processing on a frame having a black ground area in the prior art, the number of pixels of the black ground area is together counted as well. However, the black ground area is not an effective display area. Therefore, such a statistical operation containing the number of pixels of the black ground area in the prior art is erroneous, which would cause a serious distortion with the DCE processing.

SUMMARY OF THE INVENTION

Based on the above-described background of the related art, the present invention provides a DCE circuit, which uses a threshold value to perform a DCE processing on a frame to avoid an excessive enhancement result.

The present invention further provides a DCE method, which is able to avoid a frame receiving a DCE processing from distortion.

The present invention further yet provides a DCE method, which is capable of properly dealing with a frame with black background areas, so as to avoid the frame from distortion.

The DCE circuit provided by the present invention includes a grayscale statistical unit, an operation unit and a transformation unit. Wherein, the grayscale statistical unit receives a frame, divides the received frame into a plurality of statistical intervals to count the number of pixels of every the statistical interval and obtains a plurality of statistical values. When any one of the statistical values is greater than a threshold value, the operation unit would adjust each of the statistical values according to the difference between the statistical value exceeding the threshold value and the threshold value. Hereby, the transformation unit is able to produce a transformation data according to the adjusted statistical values, so as to perform a DCE processing on the frame.

In an embodiment, the DCE circuit provided by the present invention further includes a comparator, a proportional processing unit and a color allocator. Wherein, the comparator receives all the color grayscale values of a frame and delivers the largest color grayscale value therein to the transformation unit to obtain the transformed color grayscale values according to the transformation data. The proportional processing unit receives all the color grayscale values, calculates out a multiple factor corresponding to the largest color grayscale value according to the output from the transformation unit and then multiplies the received color grayscale values by the multiple factor to obtain the multiplied color grayscale values. The color allocator is coupled with the proportional processing unit and the transformation unit for outputting the transformed color grayscale values and the multiplied color grayscale values according to the operation result of the comparator.

On the other hand, the present invention provides a DCE method, which includes dividing a grayscale distribution of a frame into N pieces of statistical intervals, where N is a positive integer; counting the number of pixels of every statistical interval to obtain a plurality of statistical values and adjusting each of the statistical values according to the difference between the statistical value exceeding the threshold value and the threshold value if any one of the statistical values is greater than a threshold value, so as to obtain a transformation data to perform a DCE processing on the frame.

In an embodiment of the present invention, the steps for obtaining the transformation data further includes: deducting the threshold value from the statistical values which are exceeding the threshold value to obtain the difference value therebetween, and substituting the statistical values which are exceeding the threshold value in the statistical interval with the threshold value; further, dividing the obtained difference values by N to obtain an adjustment value, and then adding the adjustment value to every the statistical value to obtain the updated statistical value and to obtain the transformation data based on the updated statistical values.

The method provided by the present invention further includes receiving the a plurality of color grayscale data and defining the largest one thereof as the largest grayscale data, while the rest ones as a plurality of less grayscale data. In the present invention, the method further includes transforming the largest grayscale data according to the transformation data to obtain the updated largest grayscale data and dividing the updated largest grayscale data by the original largest grayscale data to obtain a multiple factor, followed by multiplying the less grayscale data by the multiple factor to obtain the updated less grayscale data and outputting the updated largest grayscale data and the updated less grayscale data.

Furthermore, the present invention provides a DCE method suitable for processing a frame having a normal display area and a black background area. The method of the present invention includes dividing the grayscale distribution of the normal display area into N pieces of statistical intervals to count the number of pixels of every statistical interval and obtaining a plurality of statistical values. The method also includes counting the number of pixels of the black background area to obtain a black background statistical value, dividing the black background statistical value by N to obtain a the black background adjustment value and adding every statistical value with the black background adjustment value to perform a DCE processing on the frame.

The method provided by the present invention furthermore includes receiving a frame and detecting the frame to decide whether or not the frame has a black background area. If no black background area is detected, the grayscale distribution of the frame is divided into N pieces of statistical intervals to count the number of pixels of every statistical interval for obtaining a plurality of statistical values. When one of the statistical values is greater than a threshold value, every the statistical value would be adjusted by the difference value between the statistical value exceeding the threshold value and the threshold value to obtain a transformation data for performing a DCE processing on the frame.

By contrast, if a black background area within the frame is detected, the grayscale distribution of the normal display area of the frame except the black background area is divided into N pieces of statistical intervals to count the number of pixels of every statistical interval for obtaining a plurality of statistical values. Meanwhile, the number of pixels of the black background area is also counted to obtain a black background statistical value, followed by dividing the black background statistical value by N to obtain a black background adjustment value and adding every statistical value with the black background adjustment value for performing a DCE processing on the frame.

It can be seen from the above described that the statistical value of every statistical interval is adjusted by the difference value between the statistical value exceeding the threshold value and the threshold value in the present invention. Therefore, the present invention is able to avoid a frame from being distorted caused by an excessive DCE processing. Besides, the present invention is capable of properly dealing with a frame with black background areas, so as to avoid the frame from being distorted.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

Figure 4:
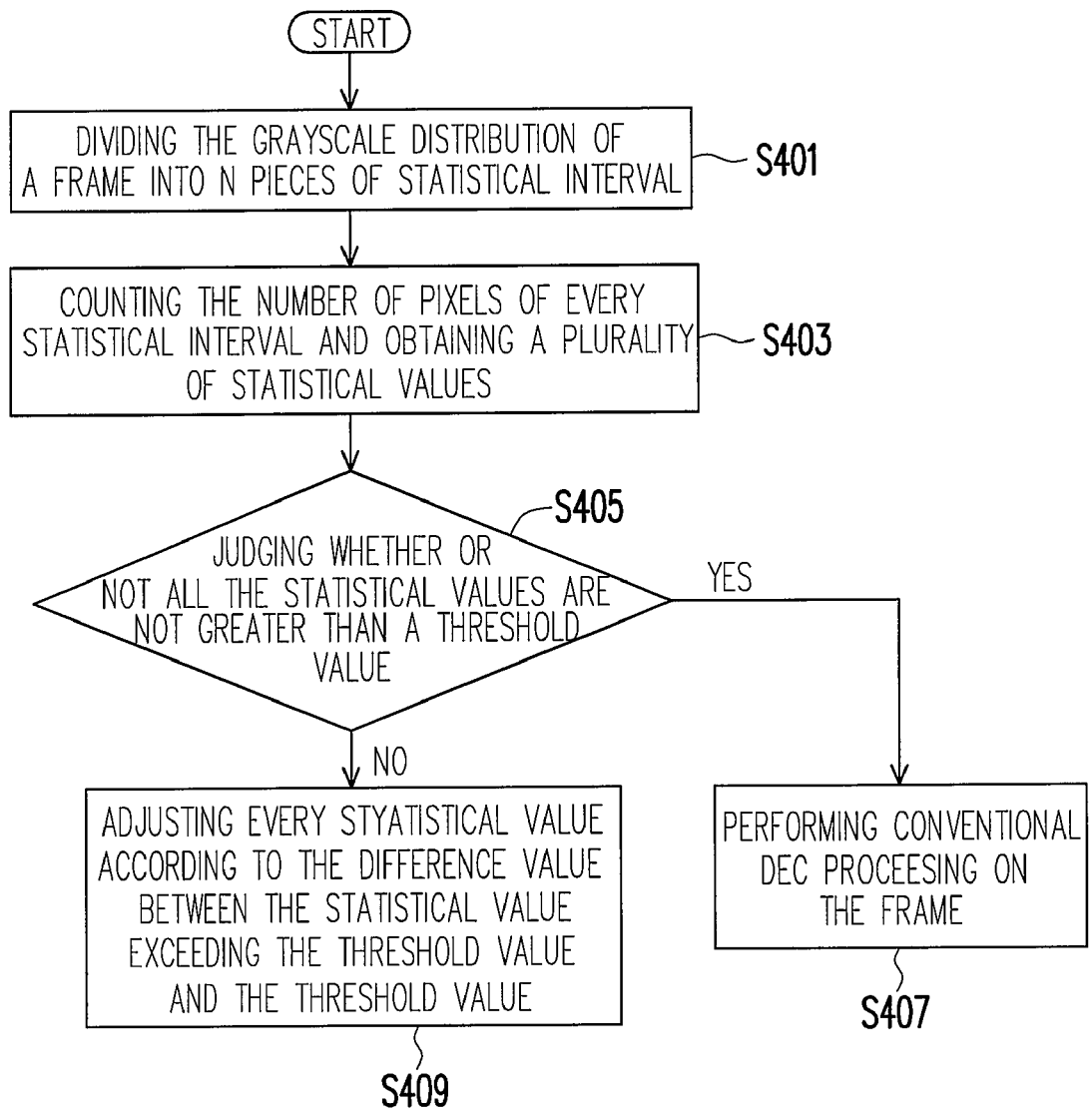
FIG. 4 is a flowchart showing the steps of a dynamic contrast enhancement method according to an embodiment of the present invention.

FIG. 4 is a flowchart showing the steps of a dynamic contrast enhancement method according to an embodiment of the present invention, which is suitable for processing a frame data. Referring to FIG. 4, in step S401, after receiving a frame, the grayscale distribution of the received frame would be divided into N pieces of statistical intervals, wherein N is a positive integer. Next, in step S403, the number of pixels of every statistical interval is counted to obtain a plurality of statistical values.

Figure 1A:
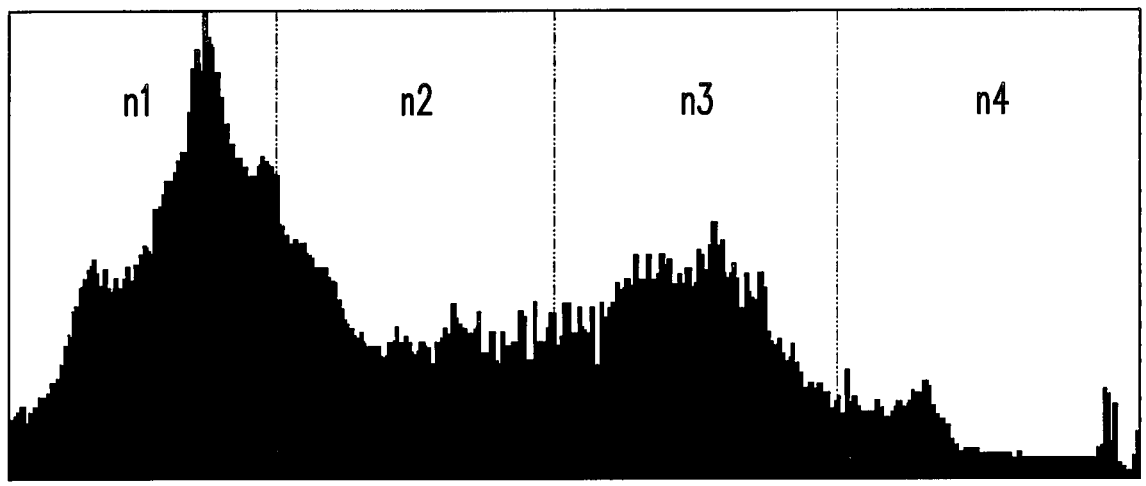
FIG. 1A is a grayscale distribution graph of a frame.
Figure 1B:
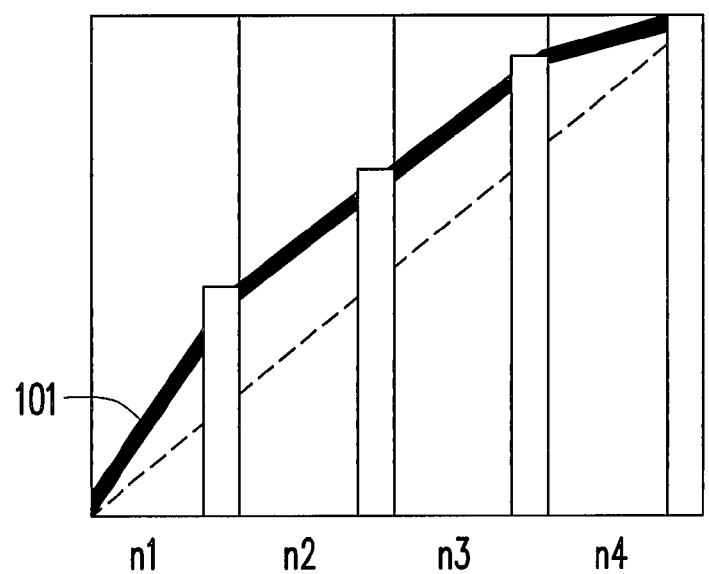
FIG. 1B is the transformation curve graph of the frame in FIG. 1A after performing dynamic contrast enhancement processing based on the prior art.
Figure 2A:
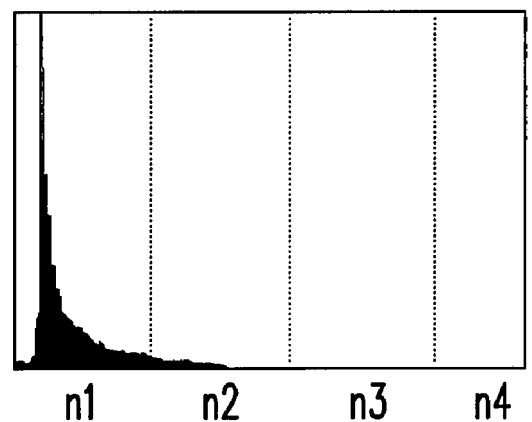
FIG. 2A is a grayscale distribution graph of another frame.
Figure 2B:
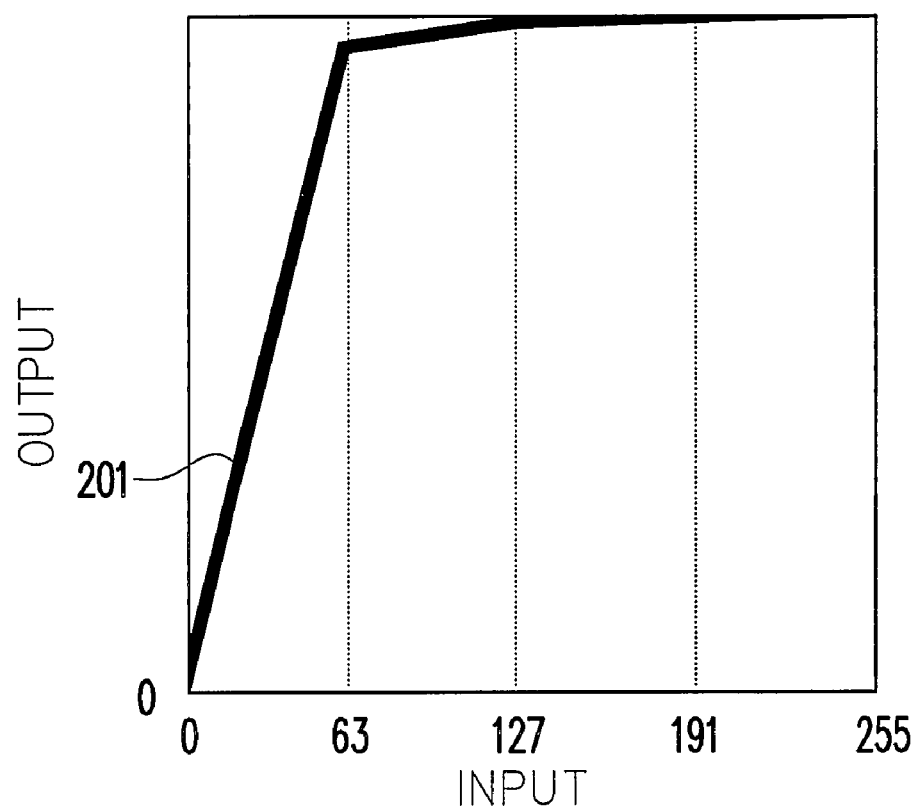
FIG. 2B is the transformation curve graph of the frame in FIG. 2A after performing dynamic contrast enhancement processing based on the prior art.

Assuming the grayscale distribution of FIG. 2A is divided into N pieces of statistical intervals for performing a DCE processing on the frame information thereof, it can be seen from FIG. 2A that N is equal to four. That is to say, the grayscale distribution of FIG. 2A is divided into four statistical intervals of n1, n2, n3 and n4 in the present invention. Afterwards, the number of pixels of every statistical interval is counted. Although the grayscale distribution is divided into four statistical intervals in the embodiment, but it should be known by those skilled in the art that the present invention covers any number of statistical intervals.

Figure 5:
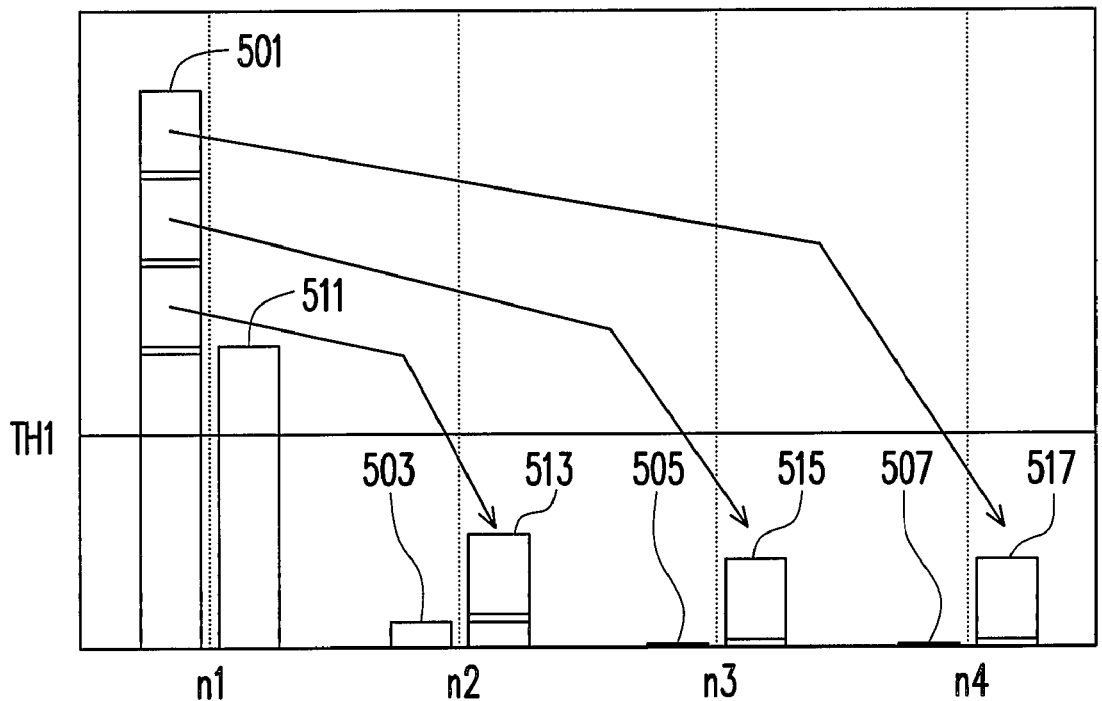
FIG. 5 is a diagram of a dynamic contrast enhancement method according to an embodiment of the present invention.

FIG. 5 is a diagram of a dynamic contrast enhancement method according to an embodiment of the present invention. Referring to FIGS. 4 and 5, once finishing counting the number of pixel of every statistical interval, a plurality of statistical values are produced. For example, the bars 501, 503, 505 and 507 in FIG. 5 represent the statistical value of every the statistical interval, respectively. Further, in step S405, it is judged whether all the statistical values are not greater than a threshold value TH1. If all the statistical values are not greater than the threshold value TH1, it goes to step S407 which makes the frame displayed performing conventional DCE processing.

By contrast, if any one of the statistical values exceeds the threshold value, it goes to step S409 where a transformation data is obtained according to the difference value between the statistical value exceeding the threshold value TH1 and the threshold value TH1, followed by performing a DCE processing on the frame.

Figure 6:
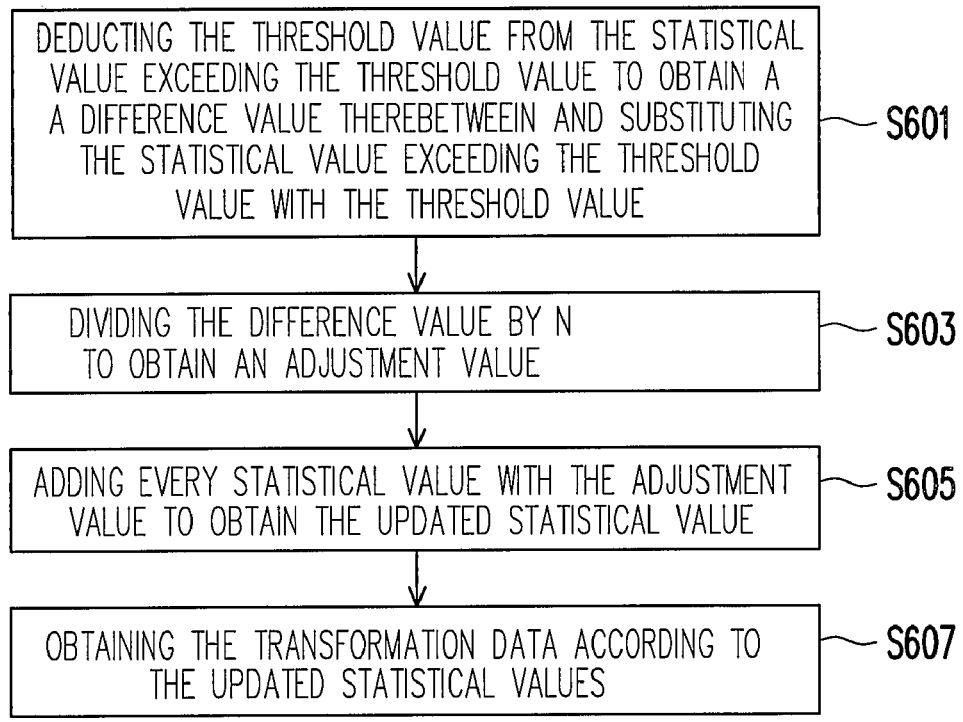
FIG. 6 is a flowchart showing the steps to obtain the transformation data according to an embodiment of the present invention.

FIG. 6 is a flowchart showing the steps to obtain the transformation data according to an embodiment of the present invention. Referring to FIGS. 5 and 6, assuming the original statistical values of every statistical interval in FIG. 5 are given as follows:

n1:1360
n2:70
n3:5
n4:5 and the threshold value TH1 is 540, it is clear that the statistical value of the statistical interval n1 is noticeably greater than the threshold value. As described by step S601, the statistical value exceeding the threshold value would be deducted by the threshold value and a difference value therebetween is obtained. In the above-given example, the statistical value of the statistical interval n1 is deducted by the threshold value TH1, a difference value of 820 is obtained. Then, the statistical value exceeding the threshold value of the statistical interval is substituted by the threshold value, thus the statistical value of the statistical interval n1 is altered to 540.

Continuing to step S603, the difference value is divided by N to obtain an adjustment value. In the embodiment, N is equal to 4. Hence, after dividing the difference value by 4, an adjustment value of 205 is obtained. Further in step S605, each of the statistical values is added by the adjustment value and the updated statistical values, represented by the bars 511, 513, 515 and 517 in FIG. 5, are obtained. The detailed calculation formulas are listed as follows:

$$n1:540+205=745$$

$$n2:70+205=275$$

$$n3:5+205=210$$

$$n4:5+205=210$$

Figure 2C:
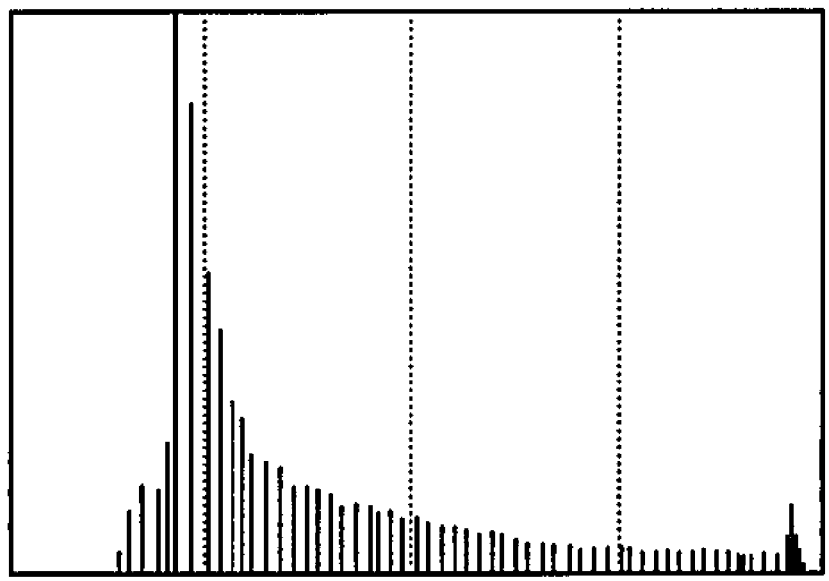
FIG. 2C is the updated grayscale distribution graph of the frame in FIG. 2A by using the transformation curve in FIG. 2B.
Figure 3:
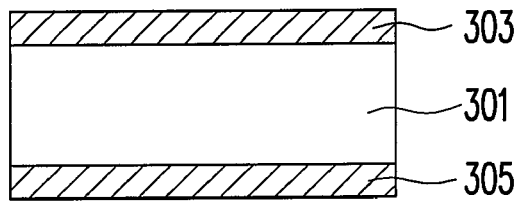
FIG. 3 is a diagram of a frame with two black background areas.
Figure 7:
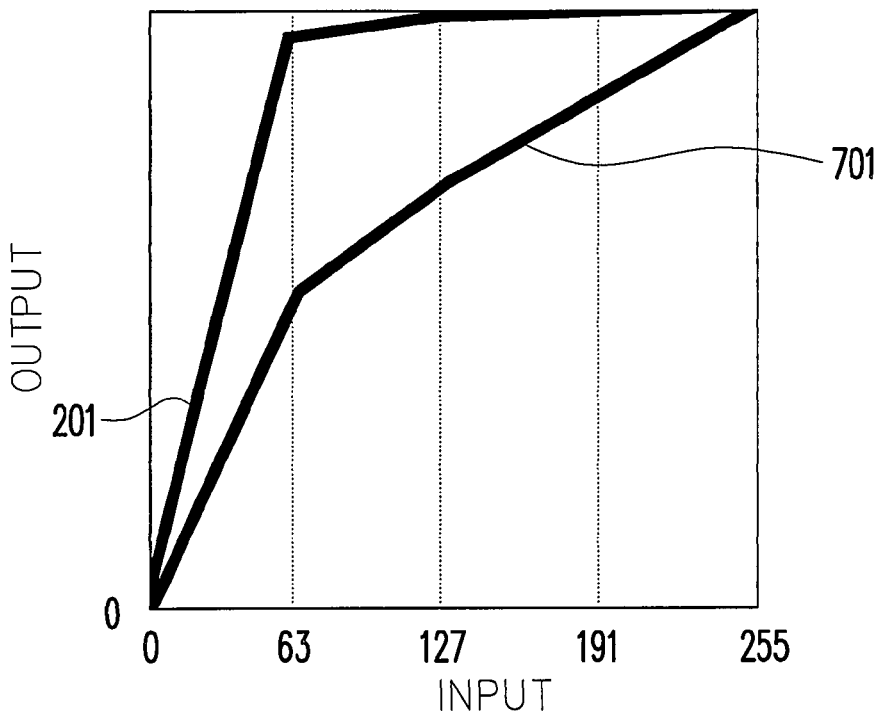
FIG. 7 is a transformation curve graph according to an embodiment of the present invention.

At the point in step S607, a transformation data can be obtained according to the updated statistical values. Referring to FIG. 7 which is a transformation curve graph according to an embodiment of the present invention, a transformation curve 701 is constructed according to the updated statistical values in FIG. 5. In comparison with the transformation curve 201 shown by FIG. 2C, the transformation curve obtained by the present invention is closer to a proportion of 1:1, which produces a frame with less distortion.

Figure 8:
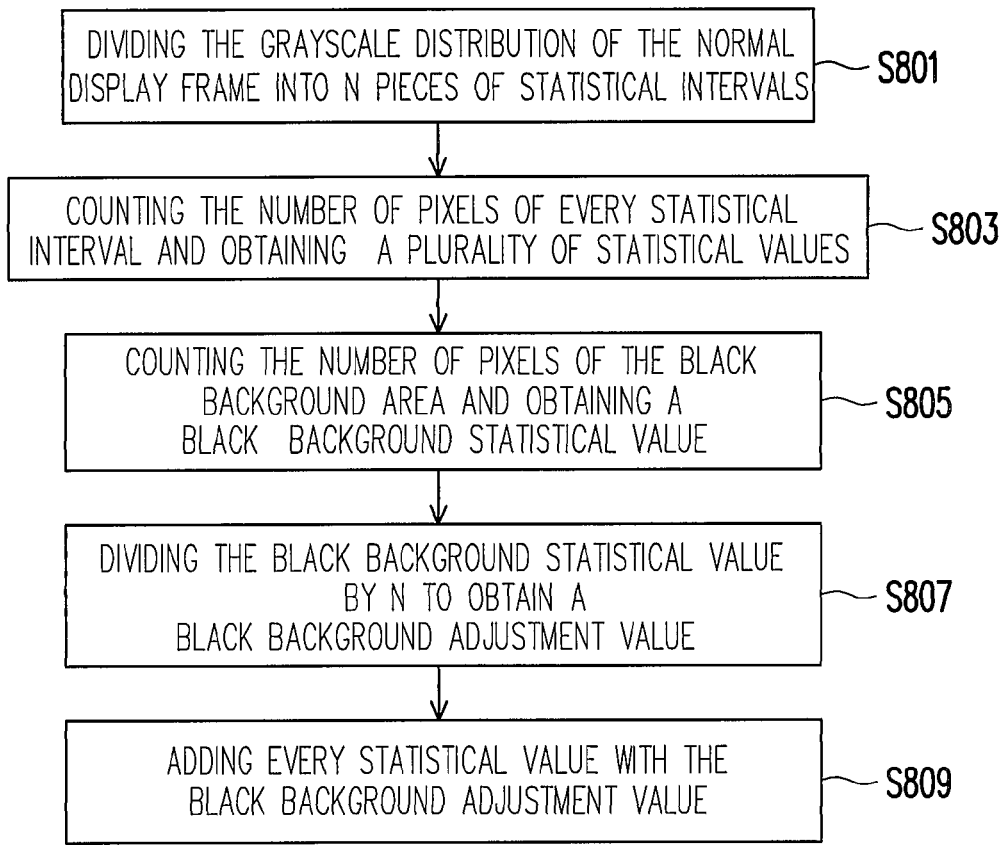
FIG. 8 is a flowchart showing the steps of a dynamic contrast enhancement method according to another embodiment of the present invention.

FIG. 8 is a flowchart showing the steps of a dynamic contrast enhancement method according to another embodiment of the present invention. Referring to FIG. 8, in step S801, if a received frame is judged to have a black background area, the grayscale distribution of normal display area of the frame except the black background area is divided into N pieces of statistical interval. Next, in step S803, the number of pixels of every statistical interval is counted to obtain a plurality of statistical values.

Afterwards, in step S805 where the processing is somehow unique, the number of pixels of the black background area is counted to obtain a black background statistical value. Assuming N is equal to 4, that is to say the grayscale distribution of the received frame is divided into four statistical intervals (n1, n2, n3 and n4). The statistical value of every the statistical interval is listed as follows:

n1:560
n2:70
n3:5
n4:5

Assuming the black background statistical value is 800. In step S807, an adjustment value of 200 of the black background area can be obtained by dividing 800 by 4. Next, in step S809, every statistical value is added by the black background adjustment value. Thus, the updated statistical values are obtained, for example:

$$n1:560+200=760$$

$$n2:70+200=270$$

$$n3:5+200=205$$

$$n4:5+200=205$$

Then, according to the present invention, the updated statistical value of every the statistical interval is proceeded following the flowcharts in FIG. 4 and FIG. 6, so as to perform a DCE processing on the frame.

Figure 9:
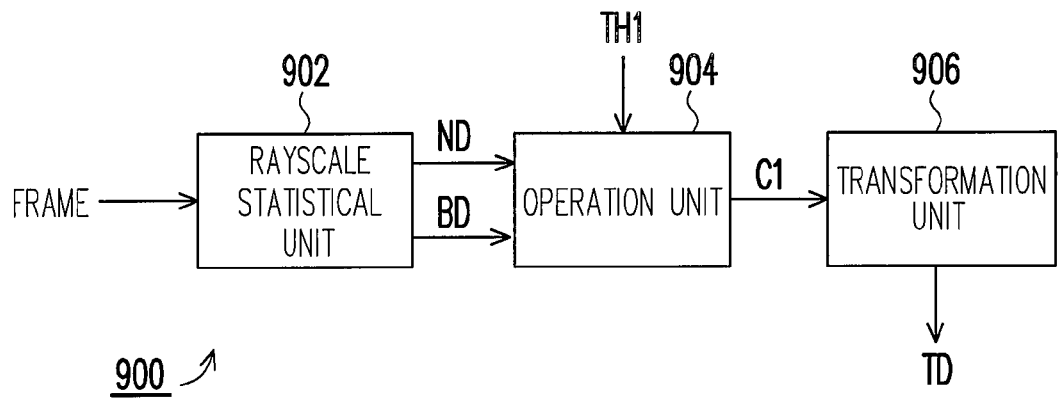
FIG. 9 is a block diagram of a dynamic contrast adjustment circuit according to an embodiment of the present invention.

FIG. 9 is a block diagram of a dynamic contrast adjustment circuit according to an embodiment of the present invention. Referring to FIG. 9, to implement the above-described method, the present embodiment provides a dynamic contrast adjustment circuit 900, which includes a grayscale statistical unit 902, an operation unit 904 and a transformation unit 906.

Continuing to FIG. 9, the grayscale statistical unit 902 is for receiving a frame, dividing the grayscale distribution of the frame into a plurality of statistical intervals, counting the number of pixels of every statistical interval and obtaining a plurality of statistical value data. The grayscale statistical unit 902 also delivers the statistical value data ND to the operation unit 904.

In some alternative embodiments, the grayscale statistical unit 902 also serves for detecting the received frame to judge whether or not the frame contains a black background area. If the received frame is judged to contain a black background area, the grayscale statistical unit 902 further counts the number of pixels of the black background area and obtains a statistical value of black background area BD to the operation unit 904 for processing.

After the operation unit 904 receives the statistical data output from the grayscale statistical unit 902, the statistical data and the threshold value TH1 are proceeded as FIG. 6 or FIG. 8 and an updated statistical value data C1 is obtained and then delivered to the transformation unit 906. The transformation unit 906 would obtain a transformation data TD, for example, a transformation curve, according to the updated statistical value data to perform a DCE processing on the frame.

Figure 10:
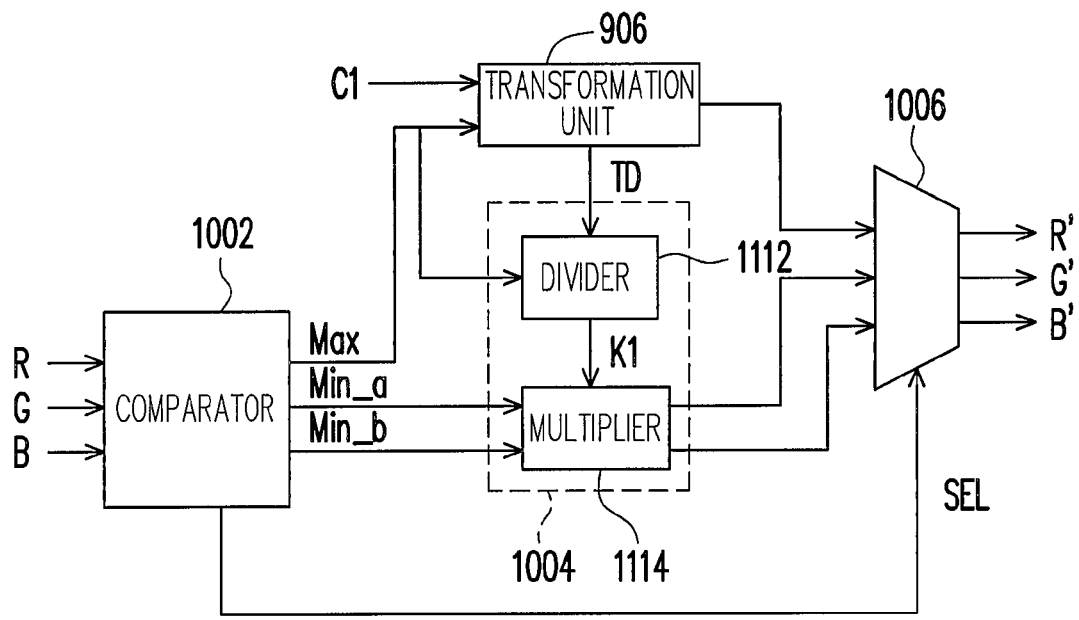
FIG. 10 is a block diagram of a dynamic contrast adjustment circuit according to an alternative embodiment of the present invention.

Since an abnormal color artifact could be produced across the color grayscales of a frame receiving a DCE processing, the frame would give a viewer an unnatural perception of vision. To solve the problem, FIG. 10 illustrates an alternative embodiment of the present invention, in which a dynamic contrast adjustment circuit is provided. Referring to FIG. 10, in some alternative embodiments, the dynamic contrast adjustment circuit 900 can further include a comparator 1002, a proportional processing unit 1004 and a color allocator 1006 to simultaneously transform the color grayscales of a frame.

Figure 11:
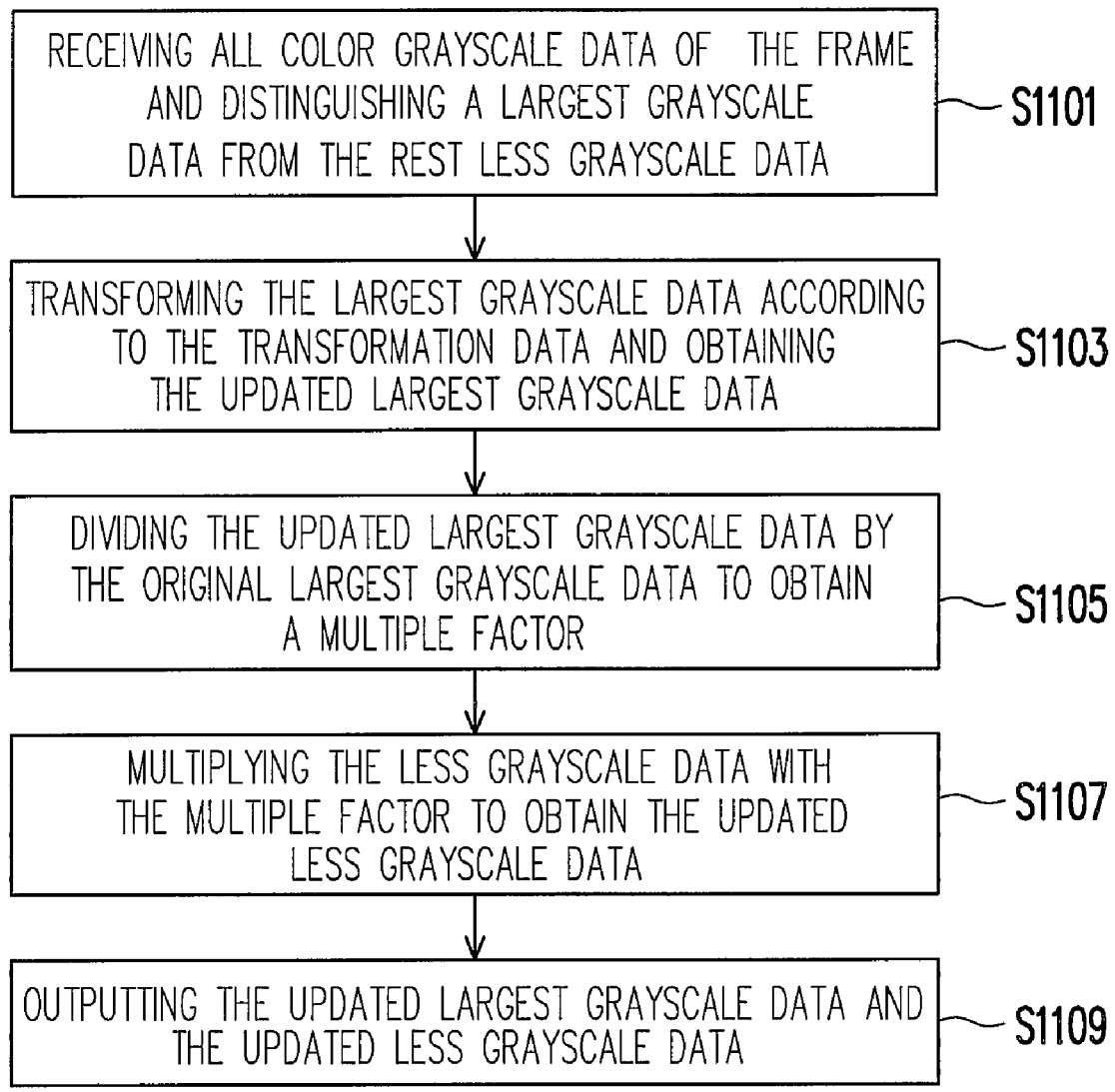
FIG. 11 is a flowchart showing the steps of a dynamic contrast enhancement method simultaneously conducting the color transformation processing according to an embodiment of the present invention.

FIG. 11 is a flowchart showing the steps of a dynamic contrast enhancement method simultaneously conducting the color transformation processing according to an embodiment of the present invention. Referring to FIGS. 10 and 11, the comparator 1002 is for receiving all the color grayscale data of a frame. In the embodiment, the color grayscale data are, but not limited by the present invention, for example, a red grayscale data R, a green grayscale data G and a blue grayscale data B. The largest one of the color grayscale data is further defined as the largest grayscale data Max, while the rest color grayscale data are defined as two less grayscale data Min_a and Min_b, as described in step S1101.

Once the comparator 1002 receives the color grayscale data, the largest grayscale data would be sent to the transformation unit 906. As described in step S1103, the transformation unit 906 transforms the largest grayscale data according to the transformation data to obtain an updated largest grayscale data, followed by sending the updated largest grayscale data to the proportional processing unit 1004.

In the embodiment, the proportional processing unit 1004 includes a divider 1112 and a multiplier 1114. In step S1105, once the output of the transformation unit 906 arrives at the proportional processing unit 1004, the updated largest grayscale data is divided by the original largest grayscale data Max to obtain a multiple factor K1 which is then sent to the multiplier 1114. After that, in step S1107, the multiplier 1114 multiplies the less grayscale data by the multiple factor K1 to obtain updated less grayscale data.

Furthermore, in step S1109, the proportional processing unit 1004 outputs the updated largest grayscale data and the updated less grayscale data to the color allocator 1006. The color allocator 1006 outputs the transformed color grayscale data R', G' and B' according to a selection signal SEL produced by the comparator 1002.

In summary, the present invention has at least the following advantages:

1. Since the present invention uses the difference value between the statistical value of a statistical interval exceeding the threshold value and the threshold value to produce the transformation data, the present invention is able to avoid a frame from being distorted caused by an excessive DCE processing.

2. Since the present invention also performs a processing on the data of a black background area, which contributes to avoid a frame containing a black background area from being distorted caused by performing a DCE processing on the frame.

3. The present allows simultaneously transforming all the color grayscales. Therefore, it is unlikely to produce an abnormal color artifact on the frame that results in frame distortion.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A dynamic contrast enhancement circuit, comprising:
   a grayscale statistical unit, used for receiving a frame, dividing the grayscale distribution of the frame into a plurality of statistical intervals to count the total number of pixels of every statistical interval, and obtaining a plurality of statistical values;
   an operation unit, coupled with the grayscale statistical unit and used for adjusting every statistical value according to the difference value between the statistical value exceeding the threshold value and the threshold value when one of the statistical values is greater than a threshold value; and
   a transformation unit, coupled with the operation unit and used for producing a transformation data according to the adjusted statistical values for performing a dynamic contrast enhancement processing on the frame.

2. The dynamic contrast enhancement circuit as recited in claim 1, further comprising:
   a comparator, receiving a plurality of color grayscale values of the frame and sending the largest one among the color grayscale values to the transformation unit to obtain the transformed color grayscale values according to the transformation data;
   a proportional processing unit, used for receiving all the color grayscale values, calculating out a multiple factor of the largest color grayscale value according to the output from the transformation unit and multiplying the rest color grayscale values except the largest color grayscale value with the multiple factor to obtain the multiplied color grayscale values; and
   a color allocator, coupled with the proportional processing unit and the transformation unit and used for outputting the transformed color grayscale values and the multiplied color grayscale value according to the operation result of the comparator.

3. The dynamic contrast enhancement circuit as recited in claim 2, wherein the proportional processing unit comprises:
   a divider, used for dividing the transformed largest color grayscale value by the original largest color grayscale value to obtain the multiple factor; and
   a multiplier, used for multiplying the rest color grayscale values except the largest color grayscale value with the multiple factor to obtain the multiplied color grayscale values.

4. The dynamic contrast enhancement circuit as recited in claim 2, wherein the color grayscale values comprise red color grayscale value, green color grayscale value and blue color grayscale value.

5. The dynamic contrast enhancement circuit as recited in claim 1, wherein the transformation data comprises a transformation curve.

6. A dynamic contrast enhancement method, comprising the following steps:
- dividing the grayscale distribution of a frame into N pieces of statistical intervals by a grayscale statistical unit, wherein N is a positive integer;
- counting the total number of pixels of every statistical interval and obtaining a plurality of statistical values by the grayscale statistical unit; and
- when one of the statistical values is greater than a threshold value, adjusting every statistical value according to the difference value between the statistical value exceeding the threshold value and the threshold value by an operation unit to obtain a transformation data to perform a dynamic contrast enhancement processing on the frame.

7. The dynamic contrast enhancement method as recited in claim 6, wherein the step for obtaining the transformation data comprises the following steps:
- deducting the statistical value exceeding the threshold value with the threshold value to obtain the difference value between the statistical value and the threshold value and substituting the statistical value of the statistical interval exceeding the threshold value with the threshold value by the operation unit;
- dividing the difference value by N to obtain an adjustment value by the operation unit;
- adding every the statistical value with the adjustment value to obtain the updated statistical value by the operation unit; and
- obtaining the transformation data according to the updated statistical value by the operation unit.

8. The dynamic contrast enhancement method as recited in claim 6, further comprising the following steps:
- receiving a plurality of color grayscale data of the frame, defining the largest one thereof as the largest grayscale data and defining the rest ones as a plurality of less grayscale data by the operation unit;
- transforming the largest grayscale data according to the transformation data to obtain a updated largest grayscale data by a transformation unit;
- dividing the updated largest grayscale data by the original largest grayscale data to obtain a multiple factor by the operation unit;
- multiplying the plurality of less grayscale data with the multiple factor by the operation unit to obtain the plurality of updated less grayscale data; and
- outputting the updated largest grayscale data and the updated less grayscale data by the operation unit.

9. The dynamic contrast enhancement method as recited in claim 8, wherein the color grayscale values comprise red color grayscale value, green color grayscale value and blue color grayscale value.

10. The dynamic contrast enhancement method as recited in claim 6, wherein the transformation data is a transformation curve.

11. A dynamic contrast enhancement method, suitable for processing a frame, having a normal display area and a black background area; the dynamic contrast enhancement method comprising the following steps:
- dividing the grayscale distribution of the normal display area into N pieces of statistical intervals, wherein N is a positive integer by a grayscale statistical unit;
- counting the total number of pixels of every statistical interval and obtaining a plurality of statistical values by the grayscale statistical unit;
- counting the total number of pixels of the black background area to obtain a black background statistical value by the grayscale statistical unit;
- dividing the black statistical values by N to obtain a black background adjustment value by an operation unit; and
- adding every the statistical value with the of the black background adjustment value by the operation unit to perform a dynamic contrast enhancement processing on the frame.

12. The dynamic contrast enhancement method as recited in claim 11, further comprising the following steps:
- receiving a plurality of color grayscale data of the frame, defining the largest one thereof as the largest grayscale data and defining the rest ones as a plurality of less grayscale data by the operation unit;
- transforming the largest grayscale data according to the transformation data to obtain a updated largest grayscale data by a transformation unit;
- dividing the updated largest grayscale data by the original largest grayscale data to obtain a multiple factor;
- multiplying the plurality of less grayscale data with the multiple factor to obtain the plurality of updated less grayscale data by the operation unit; and
- outputting the updated largest grayscale data and the updated less grayscale data by the operation unit.

13. The dynamic contrast enhancement method as recited in claim 12, wherein the color grayscale values comprise red color grayscale value, green color grayscale value and blue color grayscale value.

14. The dynamic contrast enhancement method as recited in claim 11, wherein the transformation data is a transformation curve.

15. A dynamic contrast enhancement method, comprising the following steps:
- receiving a frame by a grayscale statistical unit;
- detecting the frame to judge whether or not the frame contains a black background area by the grayscale statistical unit;
- when the frame contains no black background area, dividing the grayscale distribution of the frame into N pieces of statistical intervals by an operation unit, wherein N is a positive integer;
- counting the total number of pixels of every statistical interval and obtaining a plurality of statistical values by the grayscale statistical unit; and
- when one of the statistical values is greater than a threshold value, adjusting every the statistical value according to the difference value between the statistical value exceeding the threshold value and the threshold value by the operation unit to obtain a transformation data to perform a dynamic contrast enhancement processing on the frame.

16. The dynamic contrast enhancement method as recited in claim 15, wherein the step for obtaining the transformation data comprises the following steps:
- deducting the statistical value exceeding the threshold value with the threshold value to obtain the difference value between the statistical value and the threshold value and substituting the statistical value of the statistical interval exceeding the threshold value with the threshold value by the operation unit;
- dividing the difference value by N to obtain an adjustment value by the operation unit;
- adding every the statistical value with the adjustment value to obtain the updated statistical value by the operation unit; and obtaining the transformation data according to the updated statistical value by the operation unit.

17. The dynamic contrast enhancement method as recited in claim 15, wherein when the frame is detected containing the black background area, the method comprises the following steps:

dividing the grayscale distribution of the normal display area of the frame except the black background area into N pieces of statistical intervals by the operation unit;

counting the number of pixels of every statistical interval and obtaining a plurality of statistical values by the grayscale statistical unit;

counting the number of pixels of the black background area and obtaining a the black background statistical value by the grayscale statistical unit;

dividing the black background statistical value by N to obtain a black background adjustment value by the operation unit; and adding every the statistical value with the black background adjustment value to perform a dynamic contrast enhancement processing on the frame by the operation unit.

* * * * *